(12) United States Patent
Deperraz

(10) Patent No.: US 9,546,740 B2
(45) Date of Patent: Jan. 17, 2017

(54) FLUID COOLED SHAPE MEMORY ALLOY ACTUATED VALVE

(75) Inventor: Nicolas Deperraz, Bons en Chablais (FR)

(73) Assignee: FLUID AUTOMATION SYSTEMS S.A., Versoix (CH)

( * ) Notice: Subject to any disclaimer, the term of this patent is extended or adjusted under 35 U.S.C. 154(b) by 174 days.

(21) Appl. No.: 14/000,799

(22) PCT Filed: Mar. 9, 2012

(86) PCT No.: PCT/EP2012/001046
§ 371 (c)(1),
(2), (4) Date: Aug. 21, 2013

(87) PCT Pub. No.: WO2012/123088
PCT Pub. Date: Sep. 20, 2012

(65) Prior Publication Data
US 2013/0327967 A1 Dec. 12, 2013

(30) Foreign Application Priority Data
Mar. 11, 2011 (FR) ...................................... 11 51999

(51) Int. Cl.
*F16K 31/02* (2006.01)
*F16K 31/00* (2006.01)
(Continued)

(52) U.S. Cl.
CPC ............. *F16K 31/002* (2013.01); *F16K 11/22* (2013.01); *F16K 31/025* (2013.01); *F16K 49/005* (2013.01)

(58) Field of Classification Search
CPC ...... F16K 31/002; F16K 31/025; F16K 11/22; F16K 49/005
(Continued)

(56) References Cited

U.S. PATENT DOCUMENTS 2,518,941 A * 8/1950 Satchwell et al. ............. 337/107
3,404,837 A * 10/1968 James .......................... 236/34.5
(Continued)

FOREIGN PATENT DOCUMENTS

DE 19947324 A1 4/2001
EP 0443416 A1 8/1991
(Continued)

*Primary Examiner* — Umashankar Venkatesan
(74) *Attorney, Agent, or Firm* — The Ollila Law Group LLC

(57) ABSTRACT

A valve assembly (100) is provided. The valve assembly (100) comprises a housing (101) with a plurality of fluid ports (102-105*d*). The housing (101) includes an actuator chamber (107) configured to receive a fluid. The housing (101) also includes a valve chamber (108) configured to receive the fluid after flowing through the actuator chamber (107). The valve assembly (100) further includes one or more shape memory alloy elements (109*a*-109*d*) located within the actuator chamber (108). One or more valve seals (220*a*-220*d*) located within the valve chamber (108) are provided. The shape memory alloy elements (109) are coupled to each of the valve seals (220*a*-220*d*) to selectively move the valve seals (220*a*-220*d*) between a first position and a second position upon heating the corresponding shape memory alloy element (109*a*-109*d*) above a transformation temperature.

16 Claims, 3 Drawing Sheets

(51) Int. Cl.
*F16K 11/22* (2006.01)
*F16K 49/00* (2006.01)

(58) Field of Classification Search
USPC .................................. 251/11, 129.06, 129.04
See application file for complete search history.

(56) References Cited

U.S. PATENT DOCUMENTS

| | | | | |
|---|---|---|---|---|
| 3,613,732 | A | * | 10/1971 | Willson et al. .......... 137/625.44 |
| 3,650,505 | A | * | 3/1972 | Drexel ............................ 251/11 |
| 3,835,659 | A | * | 9/1974 | McBride, Jr. .................... 62/202 |
| 4,190,198 | A | * | 2/1980 | Casuga et al. ................ 236/34.5 |
| 4,325,217 | A | * | 4/1982 | Golestaneh ...................... 60/527 |
| 5,033,713 | A | * | 7/1991 | Thorsen ................. F03G 7/065 |
| | | | | 251/11 |
| 5,372,061 | A | | 12/1994 | Albert et al. |
| 6,253,837 | B1 | * | 7/2001 | Seiler et al. .................. 165/103 |
| 6,326,707 | B1 | * | 12/2001 | Gummin et al. .......... 310/12.15 |
| 6,691,977 | B2 | | 2/2004 | Knebel et al. |
| 6,742,542 | B1 | * | 6/2004 | Dierks .......................... 137/636 |
| 7,578,270 | B2 | | 8/2009 | Riley et al. |
| 8,083,209 | B2 | * | 12/2011 | Kozdras et al. ............. 251/337 |
| 8,991,719 | B2 | * | 3/2015 | Sheppard .................... 236/34.5 |
| 2008/0251044 | A1 | | 10/2008 | Riley et al. |
| 2009/0101019 | A1 | | 4/2009 | Coccia |
| 2013/0015376 | A1 | * | 1/2013 | Kocurek et al. ................ 251/11 |
| 2014/0103232 | A1 | * | 4/2014 | Deperraz ........................ 251/11 |

FOREIGN PATENT DOCUMENTS

| | | |
|---|---|---|
| EP | 0693406 A2 | 1/1996 |
| GB | 2232245 A | 5/1990 |
| WO | 02090807 A1 | 11/2002 |

\* cited by examiner

FLUID COOLED SHAPE MEMORY ALLOY ACTUATED VALVE

CROSS-REFERENCE TO RELATED APPLICATIONS

This is a National Stage entry of International Application No. PCT/EP2012/001046, with an international filing date of Mar. 9, 2012, which claims priority of France patent application no. 11/51999, filed Mar. 11, 2011, entitled "FLUID COOLED SHAPE MEMORY ALLOY ACTUATED VALVE".

TECHNICAL FIELD

The embodiments described below relate to valves, and more particularly, to a shape memory alloy actuated valve that is cooled by the fluid controlled by the valve.

BACKGROUND OF THE INVENTION

Fluid handling devices are well known. One type of fluid handling device is an electrically-actuated valve. Electrically-actuated valves are used in a variety of situations to control various types of fluids. Often, electrically-actuated valves are implemented where relatively fast response times are desired or where a fluid-actuated valve cannot be implemented or is not desired. In order for an electrically-actuated valve to be effective and efficient, it should consume minimal power, operate with low noise, and be cost effective to manufacture. In many applications, it is also important that the electrically-actuated valve provide an accurate and consistent fluid distribution.

One type of an electrically-actuated valve that attempts to meet the above criteria is a solenoid valve. Solenoid valves however, are typically limited in size, and in order to obtain adequate performance, a solenoid valve typically consumes a substantial amount of power. The power consumption of a solenoid valve, in some circumstances, is unacceptable. Furthermore, in some applications, it may be desirable to retain the valve in a specific open or mid-point position. If this position requires continuous actuation of the solenoid, the valve will likely consume a substantial amount of power thereby increasing the cost associated with operating the valve. In addition, solenoid valves are often expensive, large, and sometimes create an audible clicking noise as they are actuated that may be undesirable. Furthermore, the electromagnetic field generated by the solenoid valve can present problems in certain environments.

Another solution has been the use of shape memory alloys that transform shape and/or size when heated. Shape memory alloy actuated valves provide an advantage over the previously mentioned prior art solution as they can typically be manufactured smaller and generally consume less power. However, the valves have suffered in certain high temperature environments in the prior art due to a slower response time. For example, in a plunger type valve, the shape memory alloy element may be heated above its transformation temperature by passing an electrical current through the shape memory alloy element to raise the plunger against the force of a spring. In order for the plunger to return to its previous position, the shape memory alloy element must cool below its transformation temperature to allow the spring to once again seat the plunger. Because the valve cannot return to its original position until after the shape memory alloy element has cooled, shape memory alloy actuated valves have been limited in the environments they are suitable to be used. For example, until now, the valves could not be used in heated environments or be used to control heated fluids, i.e., fluids at a temperature near or above the transformation temperature. The heat from the fluid did not allow the shape memory alloy elements to cool below the transformation temperature within an acceptable time.

In an effort to overcome this problem, prior art solutions have attempted to cool the shape memory alloy elements using a cooling fluid. For example, U.S. Pat. No. 6,691,977 and U.S. Pat. No. 7,657,965 disclose shape memory alloy actuated valves that flow the fluid being controlled past the shape memory alloy elements as the fluid flows through the valve. However, both of these approaches are implemented in environments where the fluid being controlled is relatively cold, i.e., well below the shape memory alloy element's transformation temperature, to provide sufficient cooling to the shape memory alloy element. In addition, each approach provides a single inlet with a single outlet. In other words, the approaches do not allow for multiple outlets that can be coupled to various components.

Due to the above-mentioned problems, there exist certain applications that shape memory alloy actuated valves have been avoided due to the heat of the fluid being controlled. One example is in coffee machines that dispense hot water, steam, etc. In these applications, the heat of the water or steam is well above the shape memory alloy's transformation temperature. Therefore, shape memory alloy actuated valves were avoided in such situations because the temperature of the water prevented the elements from cooling below the transformation temperature at a sufficient speed.

The embodiments described below have overcome these and other problems and an advance in the art is achieved. The embodiments provide a shape memory alloy actuated valve that is cooled by the fluid being controlled. In some embodiments, the valve is cooled by the fluid prior to heating the fluid. Therefore, in this embodiment, the fluid being controlled flows by the shape memory alloy elements at a first temperature, is heated, and flows through the valve at a second temperature, which is higher than the first temperature. Therefore, the presently described embodiments cool the shape memory alloy elements even when the valve is used to control a heated fluid.

SUMMARY OF THE INVENTION

A valve assembly is provided according to an embodiment. The valve assembly comprises a housing with a plurality of fluid ports and including an actuator chamber configured to receive a fluid. According to an embodiment, the housing further comprises a valve chamber configured to receive the fluid after flowing through the actuator chamber. According to an embodiment, the valve assembly further comprises one or more shape memory alloy elements located within the actuator chamber. The valve assembly further comprises one or more valve seals located within the valve chamber with a shape memory alloy element coupled to each of the valve seals to selectively move the valve seals between a first position and a second position upon heating the corresponding shape memory alloy element above a transformation temperature.

A method of operating a valve assembly including a housing with a plurality of fluid ports is provided according to an embodiment. The method comprises steps of supplying a fluid to an actuator chamber formed in the housing. According to an embodiment, the method further comprises a step of supplying the fluid to a valve chamber formed in the housing after the fluid flows through the actuator chamber. The method further comprises a step of heating one or more shape memory alloy elements located within the actuator chamber to above a transformation temperature in order to move a valve seal coupled to the corresponding shape memory alloy element from a first position to a second position.

ASPECTS

According to an aspect, a valve assembly comprises:
a housing with a plurality of fluid ports and including:
   an actuator chamber configured to receive a fluid; and
   a valve chamber configured to receive the fluid after flowing through the actuator chamber;
one or more shape memory alloy elements located within the actuator chamber; and
one or more valve seals located within the valve chamber with a shape memory alloy element coupled to each of the valve seals to selectively move the valve seals between a first position and a second position upon heating the corresponding shape memory alloy element above a transformation temperature.

Preferably, the valve assembly further comprises a heater in fluid communication with the actuator chamber and in fluid communication with the valve chamber configured to heat the fluid from the actuator chamber prior to being received by the valve chamber.

Preferably, the valve assembly further comprises a fluid coupler providing a fluid communication path between the actuator chamber and the valve chamber.

Preferably, the valve assembly further comprises a biasing plate coupled to the housing and including one or more biasing members coupled to the one or more shape memory alloy elements to provide a biasing force on the one or more shape memory alloy elements.

Preferably, the valve assembly further comprises an electrical connector coupled to the one or more shape memory alloy elements and configured to energize the one or more shape memory alloy elements.

Preferably, the valve assembly further comprises one or more valve seats configured to form a substantially fluid-tight seal with the one or more valve seals when the valve seals are in the first position.

Preferably, the fluid enters the actuator chamber through a first fluid port and a first fluid passage and exits the actuator chamber through a second fluid passage and a second fluid port.

Preferably, the first and second fluid passages extend towards a first end of the housing away from the first and second fluid ports.

Preferably, the fluid enters the valve chamber through a third fluid port and exits the valve chamber through one or more outlet ports based on an actuation position of the valve seals.

Preferably, the fluid received by the actuator chamber is at a first temperature below the transformation temperature by at least a threshold amount.

According to another aspect, a method of operating a valve assembly including a housing with a plurality of fluid ports comprises steps of:
   supplying a fluid to an actuator chamber formed in the housing;
   supplying the fluid to a valve chamber formed in the housing after the fluid flows through the actuator chamber; and
   heating one or more shape memory alloy elements located within the actuator chamber to above a transformation temperature in order to move a valve seal coupled to the corresponding shape memory alloy element from a first position to a second position.

Preferably, the fluid supplied to the actuator chamber is at a first temperature and the method further comprises a step of heating the fluid to a second temperature higher than the first temperature prior to supplying the fluid to the valve chamber.

Preferably, the first temperature is below the transformation temperature of the shape memory alloy elements by at least a threshold amount.

Preferably, the method further comprises a step of using a biasing member coupled to each of the one or more shape memory alloy elements to provide a biasing force on the one or more shape memory alloy elements.

Preferably, the step of heating the one or more shape memory alloy elements comprises energizing the one or more shape memory alloy elements to thermoelectrically heat the one or more shape memory alloy elements.

Preferably, the method further comprises a step of forming a substantially fluid-tight seal between the one or more valve seals and one or more valve seats when the valve seals are in the first position.

Preferably, the method further comprises a step of cooling the one or more shape memory alloy elements with the fluid in the actuator chamber to below the transformation temperature to actuate the one or more valve seals back to the first position.

DETAILED DESCRIPTION OF THE INVENTION

Figure 1:
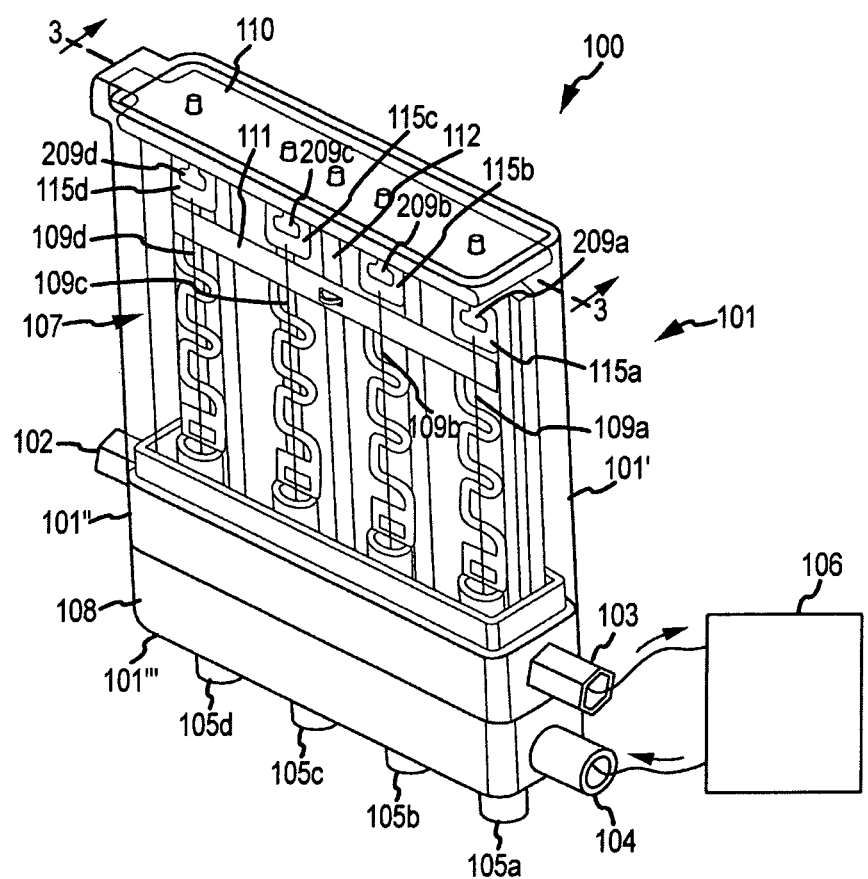
FIG. 1 shows a shape memory alloy actuated valve according to an embodiment.
Figure 2:
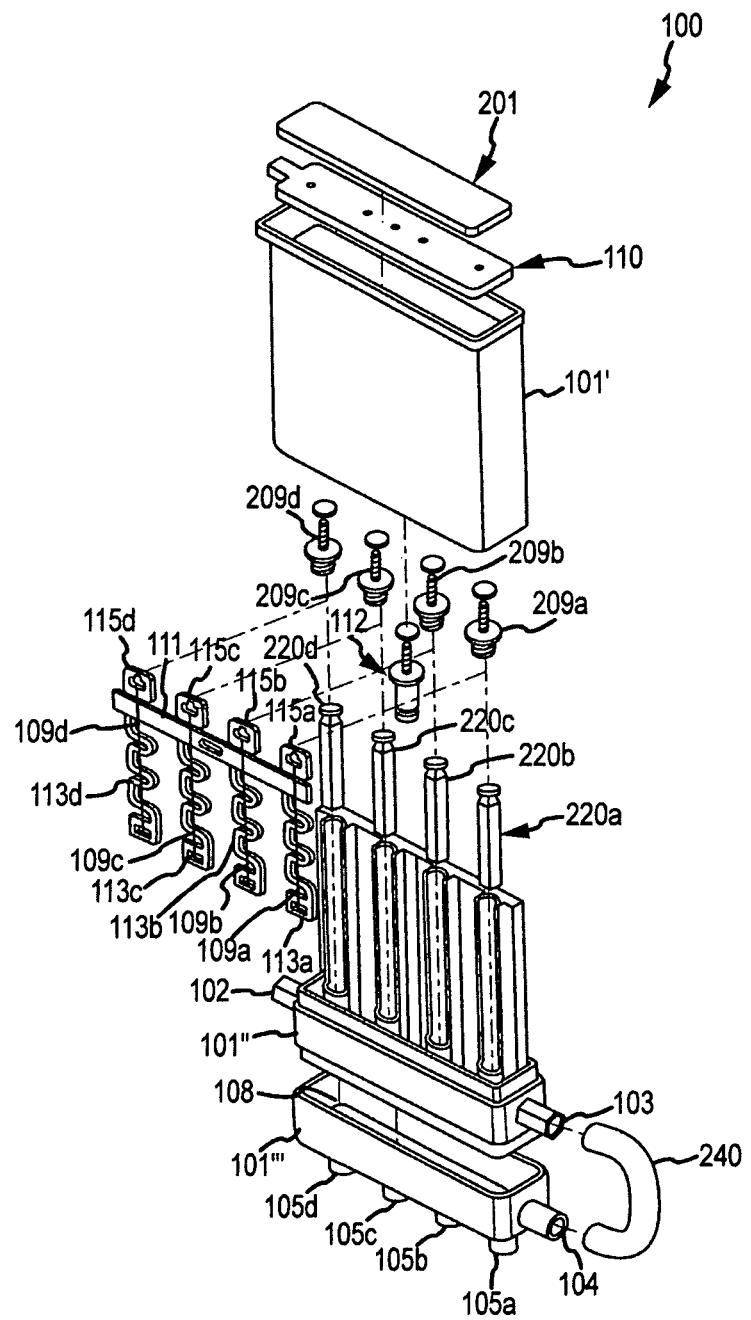
FIG. 2 shows an exploded view of the shape memory alloy actuated valve according to another embodiment.
Figure 3:
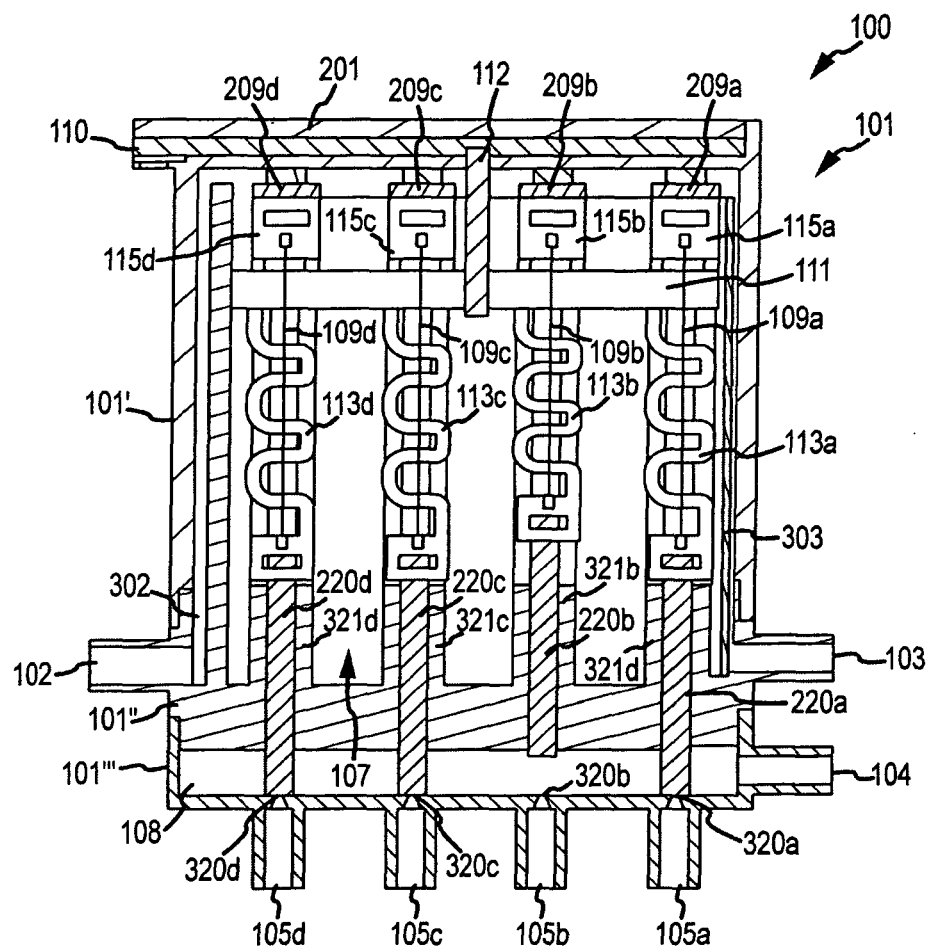
FIG. 3 shows a cross-sectional view of the shape memory alloy actuated valve according to another embodiment.

FIGS. 1-3 and the following description depict specific examples to teach those skilled in the art how to make and use the best mode of embodiments of a shape memory alloy actuated valve. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the shape memory alloy actuated valve. As a result, the embodiments described below are not limited to the specific examples described below, but only by the claims and their equivalents.

FIG. 1 shows a shape memory alloy (SMA) actuated valve assembly 100 according to an embodiment. The SMA actuated valve assembly 100 is described in some examples as being implemented in a coffee machine (not shown) in order to aid the reader in understanding certain aspects of the embodiments described; however, it should be appreciated that the SMA actuated valve assembly 100 may be utilized in a wide variety of applications that require a heated fluid supply and the presently described embodiment should in no way be limited to coffee machine applications. In addition, the valve assembly 100 may be implemented in embodiments where the fluid is not heated, but rather, multiple outlets may be desired. The valve assembly 100 shown in FIG. 1 comprises four valves with the components of the individual valves labeled "a, b, c, or d" after the components' reference number. The components without a letter designation are shared by the individual valves of the valve assembly 100. It should be appreciated that the valve assembly 100 may comprise any number of valves and the particular number of valves should in no way limit the scope of the present embodiment.

The SMA actuated valve assembly 100 comprises a housing 101 including a plurality of fluid ports 102-105*d*. The housing 101 is shown as comprising an at least partially transparent material. It should be appreciated however, that the housing 101 is shown as transparent merely to aid in viewing the interior components of the valve assembly 100 and in some embodiments, the housing 101 may not be transparent and may obstruct visibility of the interior components. Furthermore, the housing 101 is shown as comprising more than one piece. For example, in FIG. 1, the housing comprises a first portion 101', a second portion 101", and a third portion 101'". According to an embodiment, the portions 101'-101'" can be coupled using known methods such as snap-fit, adhesives, brazing, bonding, mechanical fasteners, etc. The particular method used to couple the portions 101'-101'" together may depend on the particular material used for the housing 101.

According to an embodiment, the housing 101 can define an actuator chamber 107. More specifically, in the embodiment shown, the first portion 101' and the second portion 101" of the housing 101 at least partially defines the actuator chamber 107 of the valve assembly 100. The actuator chamber 107 is described in more detail below. According to an embodiment, the housing 101 can further define a valve chamber 108. More specifically, in the embodiment shown, the second portion 101" and the third portion 101'" of the housing 101 define the valve chamber 108 of the valve assembly 100. The interior of the valve chamber 108 is not visible in FIG. 1 (See FIGS. 2 & 3). The valve chamber 108 of the valve assembly 100 is described in more detail below.

According to an embodiment, the plurality of fluid ports 102-105*d* may be provided to direct a fluid into and out of the valve assembly 100. More specifically, in the embodiment shown, the first and second fluid ports 102, 103 provide fluid communication with the actuator chamber 107 while the third fluid port 104 can provide fluid communication into the valve chamber 108 and one or more outlet ports 105*a*-105*d* can provide fluid communication out of the valve chamber 108. According to an embodiment, the fluid port 102 may be in fluid communication with a fluid. In some embodiments, the fluid provided to the fluid port 102 may be at a first temperature. For example, the fluid may comprise a cold water supply (not shown). The fluid may be delivered to the valve assembly 100 by a pump or a similar device as is generally known in the art. For example, when the valve assembly 100 is implemented in a coffee machine, the cold water supply may comprise tap water from a faucet or other type of water line. It should be appreciated that the fluid in communication with the fluid port 102 does not have to comprise cold water and the particular fluid provided to the fluid port 102 will depend on the particular implementation in which the valve assembly 100 is used. According to an embodiment, after the fluid enters the fluid port 102, the fluid flows into the actuator chamber 107.

As can be seen in FIG. 1, the valve assembly 100 further comprises one or more SMA elements 109*a*-109*d* located within the actuator chamber 107. In the embodiment shown, the valve assembly 100 comprises four SMA elements 109*a*-109*d*. However, it should be appreciated that the valve assembly 100 may include any number of SMA elements. For example, the valve assembly 100 may include a single SMA element or more than four SMA elements. The particular number of SMA elements 109*a*-109*d* provided in the valve assembly 100 should in no way limit the scope of the present invention. Because each of the SMA elements 109*a*-109*d* are substantially identical, some of the description that follows simply refers to a SMA element 109 without designating the particular letter following the SMA element in order to simplify the description.

According to an embodiment, the SMA elements 109 comprise wires; however, other configurations such as rods, plates, etc. are possible and within the scope of the claims. The SMA elements 109 are shown coupled to an electrical connector 110 at a first end. In the embodiment shown, the SMA elements 109 are coupled to the electrical connector 110 using an electrical pin 209 and an electrically conductive plate 115. However, those skilled in the art will readily recognize alternative ways to couple the SMA elements 109 to the electrical connector 110, such as soldering, conductive pastes, conductive adhesives, etc. According to an embodiment, the SMA elements 109 are coupled to the electrical connector 110 both physically and electrically. By physically coupling the SMA elements 109 to the electrical connector 110, the first end of the SMA elements 109 is held stationary. By electrically coupling the SMA elements 109 to the electrical connector 110, the SMA elements 109 can be electrically energized. The electrical pin 209 and plate 115 are shown in better detail in FIGS. 2 and 3.

The electrical connector 110 may comprise a printed circuit board (PCB) or the like. The electrical connector 110 may provide electrical communication between the SMA elements 109 and an external power source (not shown). The external power source may comprise an electrical outlet, a battery, or some type of computer or controller designed to control the actuation of one or more of the SMA elements 109. The electrical connector 110 may simply provide electrical power to the one or more SMA elements 109 or alternatively, the electrical connector 110 may include a processing system of its own configured to determine which of the SMA elements 109 to energize. For example, the electrical connector 110 may receive an electrical signal based on a known bus protocol, process the electrical signal, and energize one or more of the SMA elements 109 based on the received signal. In such a situation, the electrical connector 110 may receive a parallel or serial bus signal, for example. Those skilled in the art will readily recognize various other types of connections and signals that are suitable to energize the SMA elements 109. The particular configuration used by the electrical connector 110 is not important for purposes of the present embodiment and should in no way limit the scope of the present embodiment.

According to an embodiment, the valve assembly 100 further comprises a biasing plate 111. The biasing plate 111 can be coupled to the housing 101 to maintain a substantially constant position with respect to the housing 101. According to an embodiment, the SMA elements 109 are also coupled to a biasing plate 111. More specifically, the biasing plate 111 comprises one or more biasing members 113*a*-113*d* with each of the SMA elements 109*a*-109*d* being coupled to a biasing member 113*a*-113*d*. According to an embodiment, the SMA elements 109*a*-109*d* are coupled to the biasing members 113 at a second end opposite the first end coupled to the electrical connector 110. According to the embodiment shown, each of the biasing members 113*a*-113*d* provides a biasing force on a corresponding SMA element 109a-109d. The biasing members 113 can advantageously provide a biasing force on the SMA elements 109 to maintain the SMA elements 109 at a predetermined length when the SMA elements 109 are de-energized, i.e., below their transformation temperature. According to an embodiment, the biasing plate 111 can also provide electrical communication between the SMA elements 109 and a common return 112. In the embodiment shown, the common return 112 is coupled to the biasing plate 111 and further coupled to the electrical connector 110. The common return 112 can be at an electrical potential below the electrical potential provided to the SMA elements 109 by the electrical connector 110. In one example, the common return 112 may be at ground. In another example, the common return 112 may be at a negative potential. Therefore, the biasing plate 111 along with the common return 112 can comprise part of the electrical circuitry required to energize the SMA elements 109. Those skilled in the art will readily recognize alternative electrical configurations for energizing the SMA elements 109 that fall within the scope of the claims.

While the SMA elements 109 are shown without an insulating coating or sheath, it should be appreciated that in some embodiments, the SMA elements 109 may include an insulating coating or sheath (not shown), for example. The SMA elements 109 are generally better electrical conductors than the fluid within the actuator chamber 107 and therefore, an electrically insulating coating on the SMA elements 109 is typically not necessary. However, an insulating coating can reduce the risk of electrical shorts that could occur between the SMA elements 109 and the biasing members 113, for example. For example, an insulating coating could reduce the risk of an electrical short that could result if the SMA element 109 accidentally contacted the middle section of the biasing member 113. In embodiments such as the embodiment shown without an electrically insulating coating on the SMA elements 109, it is preferable to ensure that the ends of the SMA elements are coupled to the electrical plate 115 and biasing member 113 with the middle portion of the SMA elements 109 raised away from the biasing member 113. This configuration can increase the likelihood that substantially the entire length of the SMA element 109 will be energized and thus, increase in temperature.

According to an embodiment, the electrical connector 110 can energize the SMA elements 109 to thermoelectrically heat the SMA elements 109. Thermoelectrically heating the SMA elements 109 can be performed by applying a voltage between the electrical connector 110 and the common return 112 by way of the SMA element 109 and the corresponding biasing member 113.

SMAs are metals that are generally known for their physical transformation above a transformation temperature. By combining the appropriate alloys, the transformation temperature of the SMA elements 109 can be determined and adjusted. The transformation temperature is generally understood as the temperature at which the SMA material starts to transform from a martensite crystal structure to an austenite crystal structure. When the SMA elements 109 are below the transformation temperature, the metal remains in the martensite crystal structure. In the martensite crystal structure, the metal can be physically deformed into a first size and/or shape. The metal can remain in that shape while below the transformation temperature. According to an embodiment, the deformation (stretching) of the SMA elements 109 while the SMA elements 109 are below the transformation temperature can be accomplished using the biasing members 113.

Upon heating the SMA elements 109 to above the transformation temperature, the elements 109 begin to transform into the austenite crystal structure where the alloy returns to its "memorized," pre-deformed, size and/or shape. The transformation that occurs in SMA materials is relatively fast as no diffusion occurs as in many types of phase changes. This unique property of SMA materials can be utilized in the valve assembly 100 in order to selectively open or close the valve assembly 100 as discussed in greater detail below.

As discussed above, one of the drawbacks to SMA actuated valves is that the SMA elements 109 must cool to a temperature below the transformation temperature in order for the biasing member 113 to once again stretch the SMA elements 109. In the present embodiment, the SMA elements 109 are located within the actuator chamber 107 that receives the fluid from the first fluid port 102. As discussed above, the fluid provided to the first fluid port 102 may be at the first temperature. The first temperature is preferably below the SMA's transformation temperature by at least a threshold amount. The fluid provided at the first temperature can help cool the SMA elements 109 at a faster rate than if the fluid were not present. Therefore, while the SMA elements 109 may require more energy to heat above the transformation temperature, the return of the SMA elements 109 below the transformation temperature is much faster resulting in a faster valve response time. As those skilled in the art will appreciate, the cooling provided by the fluid may be inhibited if the SMA elements 109 are protected by an electrical insulator. This is one reason that the electrical insulator is not used in the presently shown embodiment. According to an embodiment, the fluid flows from the actuator chamber 107 to the second fluid port 103.

According to an embodiment, the second fluid port 103 can provide an outlet from the actuator chamber 107. In some embodiments, the second fluid port 103 can be in fluid communication with an external heater 106. The external heater 106 may comprise an electrical heater, for example that is suitable for heating the fluid to at least a second temperature that is higher than the first temperature. For example, when the valve assembly 100 is implemented in a coffee machine, the heater 106 may comprise a heat exchanger or a steam tank, for example. The particular type of heater 106 used however, may vary based on the particular implementation of the valve assembly 100 and should in no way limit the scope of the present embodiment. Such systems are generally known in the art and a further discussion of the particular type of heater used is omitted for brevity of the description. According to an embodiment of the invention, the external heater 106 is configured to receive the fluid from the second port 103 and heat the fluid to the second temperature. It should be appreciated that the fluid exiting the fluid port 103 may be at a temperature higher than the first temperature yet lower than the second temperature due to the heat dissipated from the SMA elements 109 and absorbed by the fluid. The heater 106 then delivers the heated fluid to the third fluid port 104. The valve assembly 100 can be actuated as described below to deliver the heated fluid from one or more of the fluid ports 105a-105d to a desired component in fluid communication with one of the fluid ports 105a-105d.

FIG. 2 shows an exploded view of the valve assembly 100 according to an embodiment. As shown, the first, second, and third portions of the housing 101'-101''' are separated. The separation of the second and third portions 101'', 101''' shows the interior of the valve chamber 108. In addition to the components described above in FIG. 1, FIG. 2 also shows a cover plate 201. The cover plate 201 can be coupled to the first portion 101' of the housing 101 in order to cover and protect the electrical connector 110. The cover plate 201 can be coupled to the first portion 101' of the housing 101 according to known methods.

Additionally, FIG. 2 shows the electrical pins 209a-209d in greater detail. The electrical pins 209 can be coupled to the electrical connector 110 and be further coupled to a corresponding SMA element 109 by the electrically conductive plate 115. Therefore, as mentioned above, the electrical pins 209 can provide an attachment between the SMA elements 109 and the electrical connector 110. The electrical pins 209 can provide both a physical connection as well as an electrical connection between the SMA elements 109 and the electrical connector 110.

According to the embodiment shown in FIG. 2, the valve assembly 100 further comprises one or more valve seals 220a-220d. As shown better in FIG. 3, the valve seals 220 are located within the valve chamber 108 and extend into the actuator chamber 107 where each of the valve seals 220 is coupled to a SMA element 109. According to the embodiment shown, the valve seal 220 comprises a valve plunger; however, it should be appreciated that other types of valve seals may be used, such as a spool for a spool type valve. The valve seal 220 can be configured to form a substantially fluid-tight seal with a corresponding valve seat (FIG. 3) in order to selectively control fluid flow out of one of the fluid ports 105a-105d. According to an embodiment, the valve seal 220 can be coupled to the SMA elements 109, the biasing member 111 or both. Advantageously, the valve seal 220 can move from a first position to a second position when the SMA element 109 is energized and heated above the transformation temperature.

Further shown in FIG. 2 is a fluid coupler 240. The fluid coupler 240 may comprise a pipe, hose, conduit, etc. The fluid coupler 240 can provide fluid communication between the second fluid port 103 and the further fluid port 104. For example, the fluid coupler 240 may be provided in embodiments that do not implement the heater 106 shown in FIG. 1. Therefore, it should be appreciated that the fluid provided to the fluid port 104 may not be heated by an external heater. However, it is preferable that the fluid provided to the fluid port 104 comprises substantially the same fluid that is provided from the fluid port 103. In these embodiments, the valve chamber 108 can provide one or more fluid outlets 105a-105d while providing a single fluid inlet.

FIG. 3 shows a cross-sectional view of the valve assembly 100 taken along line 3-3 of FIG. 1 according to an embodiment. As can be seen in FIG. 3, the fluid port 102 is in fluid communication with the actuator chamber 107 via a fluid passage 302 formed in the housing 101. Similarly, the fluid port 103 is in fluid communication with the actuator chamber 107 via a fluid passage 303 formed in the housing 101. The fluid passages 302, 303 are shown extending towards the top of the actuator chamber 107 away from the valve chamber 108 according to the orientation shown in the drawings. This can ensure that the fluid within the actuator chamber 107 is maintained at a sufficient level as the fluid is required to reach the top of the fluid passage 303 before exiting the actuator chamber 107. Therefore, a greater portion of the SMA elements 109 are surrounded by the fluid.

According to an embodiment, the valve seals 220 are guided by supports 321a-321d formed in the housing 101. As can be appreciated, the supports 321a-321d can help guide the valve seals 220 as they are raised and lowered in response to energizing and de-energizing the SMA elements 109. While the valve seals 220 are shown located within the valve chamber 108 and extending into the actuator chamber 107 to be coupled to the SMA elements 109, it should be appreciated that in alternative embodiments, an additional component may be provided to couple the components together. Therefore, the valve seals 220 do not have to extend into the actuator chamber 107. In an additional alternative embodiment, the SMA elements 109 may extend into the valve chamber 108 to couple the valve seals 220.

Further shown in FIG. 3 are the valve seats 320a-320d. In the embodiment shown, the valve seals 220 can form a substantially fluid-tight seal with the valve seats 320 when in a first position, i.e., normally closed valve. However, it should be appreciated that in other embodiments, the valve seals 220 may be raised away from the valve seats 320 when in the first position, i.e., normally open valve. As can be appreciated, when a valve seal 220 is raised away from the valve seat 320 to a second position as shown for the valve seal 220b and valve seat 320b, fluid is allowed to flow from the valve chamber 108 to the respective port 105. In the embodiment shown where the valve seal 220b is raised, fluid is allowed to flow from the valve chamber 108 to the fluid port 105b. It should be appreciated that the valve seal 220, the valve seat 320, or both can include a sealing member (not shown), such as a rubber sealing member to increase the sealing capability of the valve seal 220.

In use, fluid can be introduced into the valve assembly 100 through the fluid port 102 and the fluid passage 302. The fluid introduced into the valve assembly 100 through the fluid port 102 is at a first temperature. Preferably, the temperature of the fluid is below the SMA element's transformation temperature by at least a threshold amount. In one example embodiment, the fluid introduced through the fluid port 102 comprises cold water from a cold water supply, such as a faucet in a coffee shop or the like. The fluid flows from the fluid passage 302 to the actuator chamber 107. As the fluid enters the actuator chamber 107, it contacts the SMA elements 109 thereby lowering the temperature of the SMA elements 109. The fluid then flows into the fluid passage 303 and out the fluid port 103. The fluid may flow out of the fluid port 103 and directly into the fluid port 104 via the fluid coupler 240. Alternatively, the fluid may flow out of the fluid port 103 towards the heater 106. The heater heats the fluid to a second temperature, which is higher than the first temperature. The heated fluid then enters the valve chamber 108 through the fluid port 104. The heated fluid may further include additives. For example, in the coffee machine example, flavor additives may be added to the hot water prior to reaching the fluid port 104. As can be appreciated, in some embodiments, if none of the valve seals 220 are raised away from the valve seats 320, the fluid will only flow through the actuator chamber 107 if the heater 106 is being filled. Other embodiments may recycle some of the cold fluid using a bypass line, for example, to maintain the fluid within the actuator chamber 107 at the first temperature.

According to an embodiment, in order to actuate one of the valves of the valve assembly 100, the corresponding SMA element 109 can be energized. Upon energizing an SMA element 109, the SMA element 109 is thermoelectrically heated to above its transformation temperature to overcome friction as well as the force provided by the corresponding biasing member 113. For example, if the SMA element 109b is energized as shown in FIG. 3, the SMA element 109b overcomes the force of the biasing member 113b to reduce in size thereby moving the valve seal 220b from a first position to a second position to raise the valve seal 220b away from the valve seat 320b. With the valve seal 220b moved away from the valve seat 320b, the fluid within the valve chamber 108 can flow out the corresponding fluid port 105b thereby opening valve "b." It should be appreciated that the fluid ports 105a-105d may be in fluid communication with a variety of components. For example, if the valve assembly 100 is utilized in a coffee machine, the fluid ports 105a-105d may be provided to a coffee supply, a steam nozzle, a rinse nozzle, etc. The fluid ports 105a-105d could provide hot water or steam based on the temperature setting of the heater 106.

Upon de-energizing the SMA element 109b, the temperature of the SMA element 109b lowers. The speed of the temperature drop of the SMA element 109b is increased due to the fluid within the actuator chamber 107 that is at the first temperature. Once the temperature of the SMA element 109b falls below the transformation temperature, the biasing member 113b can stretch the SMA element 109b to lower the valve seal 220b back towards the valve seat 320b to once again form a substantially fluid-tight seal. While the present embodiment describes thermoelectrically heating, it should be understood that other methods may be used for heating the SMA elements 109. Furthermore, it should be appreciated that while the present embodiment describes the SMA elements 109 being stretched using the biasing member 113, it is envisioned that in alternative embodiments, the weight of the valve seal 220, for example, could be used to provide the biasing force to stretch the SMA elements 109.

Although not shown in the drawings, it should be appreciated that the valve seals 220 or the supports 321 may comprise a sealing member to form a substantially fluid-tight seal between the two components. Unlike prior art valves that required relatively tight sealing tolerances, resulting in increased friction as the valve seal 220 moved within the supports 321, the present invention does not require as tight of sealing tolerance between the two components. This is because the actuator chamber 107 already contains the same fluid that is present in the valve chamber 108, except at a lower temperature. Therefore, while some leakage may result in a slight change in temperature within one of the chambers 107, 108, a small amount of leakage should not seriously affect the components of the valve assembly 100.

The embodiments described above provide a unique SMA actuated valve assembly 100 that can be utilized to control the flow of fluids. In some embodiments, the fluid may be at a temperature near to or higher than the SMA's transformation temperature. The presently described embodiments allow the fluid to cool the SMA elements prior to being heated. Advantageously, although a fluid at an elevated second temperature may be controlled by the valve, the fluid at a lower first temperature can be used to cool the SMA elements 109 resulting in a faster valve response time than could be realized in the past. Furthermore, while it is known to use a separate cooling fluid, i.e., a fluid not being controlled by the valve's actuation, the present embodiment eliminates the need for a separate fluid. Advantageously, the valve assembly's operation cost can be reduced.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments of, and examples for, the shape memory alloy actuated valve are described herein for illustrative purposes, various equivalent modifications are possible within the scope of the present description, as those skilled in the relevant art will recognize. The teachings provided herein can be applied to other shape memory alloy actuated valve, and not just to the embodiments described above and shown in the accompanying figures. Accordingly, the scope of the invention should be determined from the following claims.

I claim:

1. A valve assembly (100), comprising:
    a housing (101) with a plurality of fluid ports (102-105d) and including:
        an actuator chamber (107) configured to receive a fluid; and
        a valve chamber (108) configured to receive the fluid after flowing through the actuator chamber (107);
    one or more shape memory alloy elements (109a-109d) located within the actuator chamber (108); and
    one or more valve seals (220a-220d) located within the valve chamber (108) with a shape memory alloy element (109) coupled directly to each of the valve seals (220a-220d) to selectively move the valve seals (220a-220d) between a first position and a second position upon heating the corresponding shape memory alloy element (109a-109d) above a transformation temperature;
    a biasing plate (111) coupled to the housing (101) and including one or more biasing members (115a-115d) coupled directly to the one or more shape memory alloy elements (109a-109d) to provide a biasing force on the one or more shape memory alloy elements (109a-109d).

2. The valve assembly (100) of claim 1, further comprising a heater (106) in fluid communication with the actuator chamber (107) and in fluid communication with the valve chamber (108) configured to heat the fluid from the actuator chamber (107) prior to being received by the valve chamber (108).

3. The valve assembly (100) of claim 1, further comprising an uninterrupted fluid coupler (240) providing a fluid communication path between the actuator chamber (107) and the valve chamber (108).

4. The valve assembly (100) of claim 1, further comprising an electrical connector (110) coupled to the one or more shape memory alloy elements (109a-109d) and configured to energize the one or more shape memory alloy elements (109a-109d).

5. The valve assembly (100) of claim 1, further comprising one or more valve seats (320a-320d) configured to form a substantially fluid-tight seal with the one or more valve seals (220a-220d) when the valve seals (220a-220d) are in the first position.

6. The valve assembly (100) of claim 1, wherein the fluid enters the actuator chamber (107) through a first fluid port (102) and a first fluid passage (302) and exits the actuator chamber (107) through a second fluid passage (303) and a second fluid port (103).

7. The valve assembly (100) of claim 6, wherein the first and second fluid passages (302, 303) extend towards a first end of the housing (101) away from the first and second fluid ports (102, 103).

8. The valve assembly (100) of claim 1, wherein the fluid enters the valve chamber (108) through a third fluid port (104) and exits the valve chamber (108) through one or more outlet ports (105a-105d) based on an actuation position of the valve seals (220a-220d).

9. The valve assembly (100) of claim 1, wherein the fluid received by the actuator chamber (107) is at a first temperature below the transformation temperature by at least a threshold amount.

10. A method of operating a valve assembly including a housing with a plurality of fluid ports, comprising steps of:
supplying a fluid to an actuator chamber formed in the housing;
supplying the fluid to a valve chamber formed in the housing after the fluid flows through the actuator chamber;
heating one or more shape memory alloy elements located within the actuator chamber to above a transformation temperature in order to move a valve seal coupled directly to the corresponding shape memory alloy element from a first position to a second position;
coupling a biasing plate to the housing;
coupling one or more biasing members directly to the one or more shape memory alloy elements to provide a biasing force on the one or more shape memory alloy elements;
coupling the one or more biasing members to the biasing plate.

11. The method of claim 10, wherein the fluid supplied to the actuator chamber is at a first temperature and the method further comprises a step of heating the fluid to a second temperature higher than the first temperature prior to supplying the fluid to the valve chamber.

12. The method of claim 11, wherein the first temperature is below the transformation temperature of the shape memory alloy elements by at least a threshold amount.

13. The method of claim 10, further comprising a step of using a biasing member coupled to each of the one or more shape memory alloy elements to provide a biasing force on the one or more shape memory alloy elements.

14. The method of claim 10, wherein the step of heating the one or more shape memory alloy elements comprises energizing the one or more shape memory alloy elements to thermoelectrically heat the one or more shape memory alloy elements.

15. The method of claim 10, further comprising a step of forming a substantially fluid-tight seal between the one or more valve seals and one or more valve seats when the valve seals are in the first position.

16. The method of claim 12, further comprising a step of cooling the one or more shape memory alloy elements with the fluid in the actuator chamber to below the transformation temperature to actuate the one or more valve seals back to the first position.

* * * * *